(12) United States Patent
Held et al.

(10) Patent No.: US 6,395,176 B1
(45) Date of Patent: May 28, 2002

(54) METHOD FOR TREATING WASTE-ACTIVATED SLUDGE USING ELECTROPORATION

(75) Inventors: Jeffry Held, Chicago, IL (US); Satya P. Chauhan, Columbus, OH (US)

(73) Assignee: D-H2O L.L.C., Chicago, IL (US)

( * ) Notice: Subject to any disclaimer, the term of this patent is extended or adjusted under 35 U.S.C. 154(b) by 0 days.

(21) Appl. No.: 09/612,776

(22) Filed: Jul. 10, 2000

Related U.S. Application Data

(63) Continuation-in-part of application No. 09/468,427, filed on Dec. 21, 1999, which is a continuation of application No. 09/229,279, filed on Jan. 13, 1999, now Pat. No. 6,030,538, which is a continuation-in-part of application No. 08/934,548, filed on Sep. 22, 1997, now Pat. No. 5,893,979, which is a continuation-in-part of application No. 08/552,226, filed on Nov. 1, 1995, now Pat. No. 5,695,650.

(51) Int. Cl.$^7$ ................................ C02F 1/461
(52) U.S. Cl. .................. 210/610; 210/622; 210/624; 210/626; 210/609; 210/748; 205/751; 422/22
(58) Field of Search .................. 210/606, 610, 210/622, 624, 625, 626, 609, 748, 764, 768, 808, 315, 323.1, 323.2, 497.01, 497.3; 205/751; 422/22

(56) References Cited

U.S. PATENT DOCUMENTS

| | | | |
|---|---|---|---|
| 3,913,500 A | * | 10/1975 | Paccione et al. ............. 110/15 |
| 5,846,425 A | * | 12/1998 | Whiteman .................. 210/606 |
| 6,030,538 A | * | 2/2000 | Held .......................... 210/748 |

OTHER PUBLICATIONS

Chauhan, "Feasibility of Biosludge Dewatering Using Pulsed Electric Fields," Battelle, p. 1–24, Sep. 17, 1998.*

* cited by examiner

*Primary Examiner*—Peter A. Hruskoci
(74) *Attorney, Agent, or Firm*—Hamman & Benn

(57) ABSTRACT

A system that allows the flexibility of primary and secondary treatment of municipal sludge, paper-pulp sludge, animal and plant waste, whereby the treatment thereof via electroporation may be used either as the primary dewatering treatment, secondary dewatering treatment, direct WAS-treatment, and combinations with other conventional dewatering techniques, in order to provide the municipal treatment plant, or the paper-pulp treatment plant, with the most cost-effective and efficient system as possible. The electroporated-treated sludge releases hitherto unreleased biosolids exiting from the PEF-electroporation system, which are returned to aeration tanks. The electroporation process causes the release of intracellular dissolved/organic matter, which is used as "food" for the bacteria of the aeration tanks.

1 Claim, 4 Drawing Sheets

METHOD FOR TREATING WASTE-ACTIVATED SLUDGE USING ELECTROPORATION

CROSS REFERENCE TO RELATED APPLICATION

This is a continuation-in-part application of application Ser. No. 09/468,427, filed on Dec. 21, 1999, which is incorporated by reference herein in its entirety, which is a continuation of application Ser. No. 09/229,279, filed on Jan. 13, 1999, now U.S. Pat. No. 6,030,538, which is a continuation-in-part of application Ser. No. 08/934,548, filed on Sep. 22, 1997, now U.S. Pat. No. 5,893,979, which is a continuation-in-part of application Ser. No. 08/552,226, filed on Nov. 1, 1995, now U.S. Pat. No. 5,695,650.

BACKGROUND OF THE INVENTION

In parent application Ser. No. 09/468,427, there is disclosed a system and method for dewatering and treating waste-activated sludge (WAS) emanating from municipal waste, or pulp-waste from a paper mill, as well as treating animal and plant waste. In that application, the method for breaking down the WAS is to subject the WAS to electroporation, which incorporates nonarcing, cyclical high voltages in the range of between 15 kV/cm and 100 kV/cm, which break down inter-cellular and intracellular molecular bonds, to thus release inter-cellular and intracellular water, whereby the WAS is rendered inactive and greatly reduced in mass.

In said above-noted copending application, the apparatus and method disclosed therein, while capable in certain circumstances of being a primary municipal-sludge treatment, its intended and main objective was to use it as a secondary treatment to previously-dewatered municipal waste sludge. It is the goal of the present invention to adapt the method and apparatus of said copending application Ser. No. 09/468,427 into a main, primary treatment of municipal waste sludge.

In a previous (Phase I) project, it has been demonstrated the laboratory feasibility of pulsed electric field (PEF) for disrupting the biomass in waste activated sludge (WAS) derived from municipal wastewater treatment. While there was no significant increase in the solids content of dewatered sludge, the quantity of WAS needing disposal was estimated to be significantly reduced.

Encouraged by the Phase I results, a pilot plant for testing at one or two wastewater treatment plants that generate WAS has been developed. It has been decided that a pulsed electric field (PEF) system that could handle 0.5 to 1.0 pgm WAS feed be designed. This requires an 8 kw power supply capable of generating 30 kV and pulse generator capable of handling 50 amp peak, current, bi-polar pulses, square wave, 10 $\mu$s pulse width, and 3000 pulses/second (pps).

SUMMARY OF THE INVENTION

It is the primary objective of the present invention to provide a method and apparatus for dewatering municipal waste sludge, paper-pulp waste sludge, animal and plant waste, using electroporation for the primary treatment of the sludge.

It is also a primary objective of the present to provide such a system that will allow flexibility as to the primary and secondary treatment of municipal sludge, paper-pulp sludge, animal and plant waste, whereby the treatment thereof via electroporation may be used either as the primary dewatering treatment, secondary dewatering treatment, direct WAS-treatment, and combinations with other conventional dewatering techniques, in order to provide the municipal treatment plant, or the paper-pulp treatment plant, with the most cost-effective and efficient system as possible.

BRIEF DESCRIPTION OF THE DRAWING

The invention will be more readily understood with reference to be accompanying drawings, wherein.

DETAILED DESCRIPTION OF THE INVENTION

Figure 2:
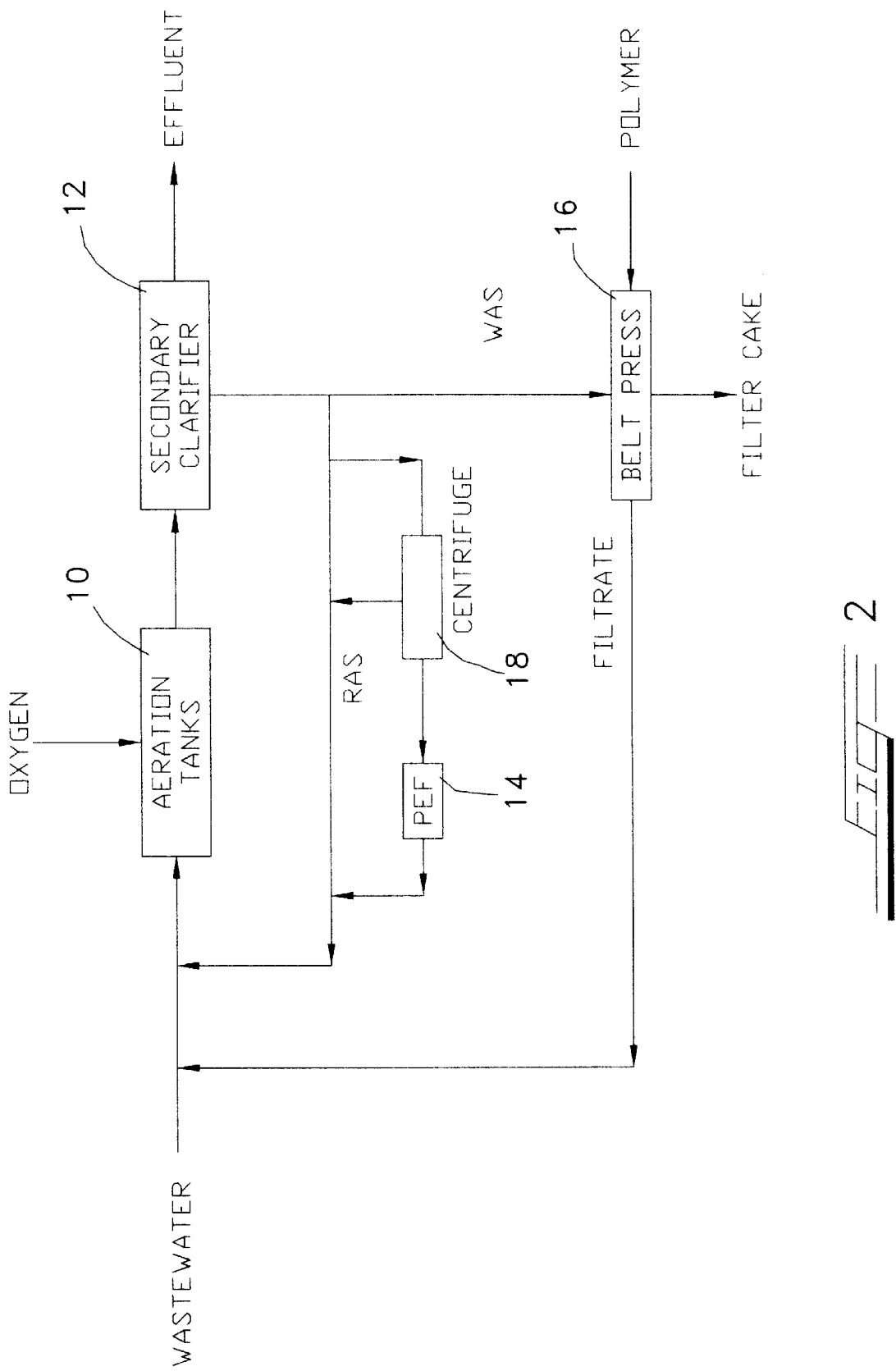
FIG. 2 is a schematic showing the electroporation system used in conjunction as a primary dewatering treatment in accordance with the present invention.

The original concept for the pulsed-electric field (PEF) effect using electroporation was to dewater the previously-dewatered sludge. However, additional PEF data on a paper plant sludge has indicated that the big PEF effect from electroporation of WAS occurs at higher energy levels (e.g., 100 J/mL; or 400 k Wh/ton (DS) for feed at 6 percent solids), whereby cells are disrupted. The result is inactivation of cells, breakage of cells and release of some intracellular dissolved/organic matter and typically a worsening of flocculation and dewatering. Therefore, a more effective way of using this process is to recycle all of the PEF-treated sludge back to a aerobic bioreactor to utilize the sludge as food; that is, it has been discovered that the PEF-electroporation effect on disrupting the cellular units of the WAS has been to release intracellular dissolved/organic matter. This intracellular dissolved/organic matter is just the type of ideal "food" upon which the aerobic bioreactor flourishes. Thus, returning this released intracellular dissolved/organic matter back to the aerobic bioreactor will increase the BOD load on the bioreactor, and will thus reduce the quantity of WAS by up to about 50 percent. The flowsheet for this scenario is shown in FIG. 2. Thus, it is now practical to employ the PEF-electroporation system as not only a secondary system for treating previously-dewatered sludge, but also to employ it as a primary system, as described hereinbelow.

Figure 1:
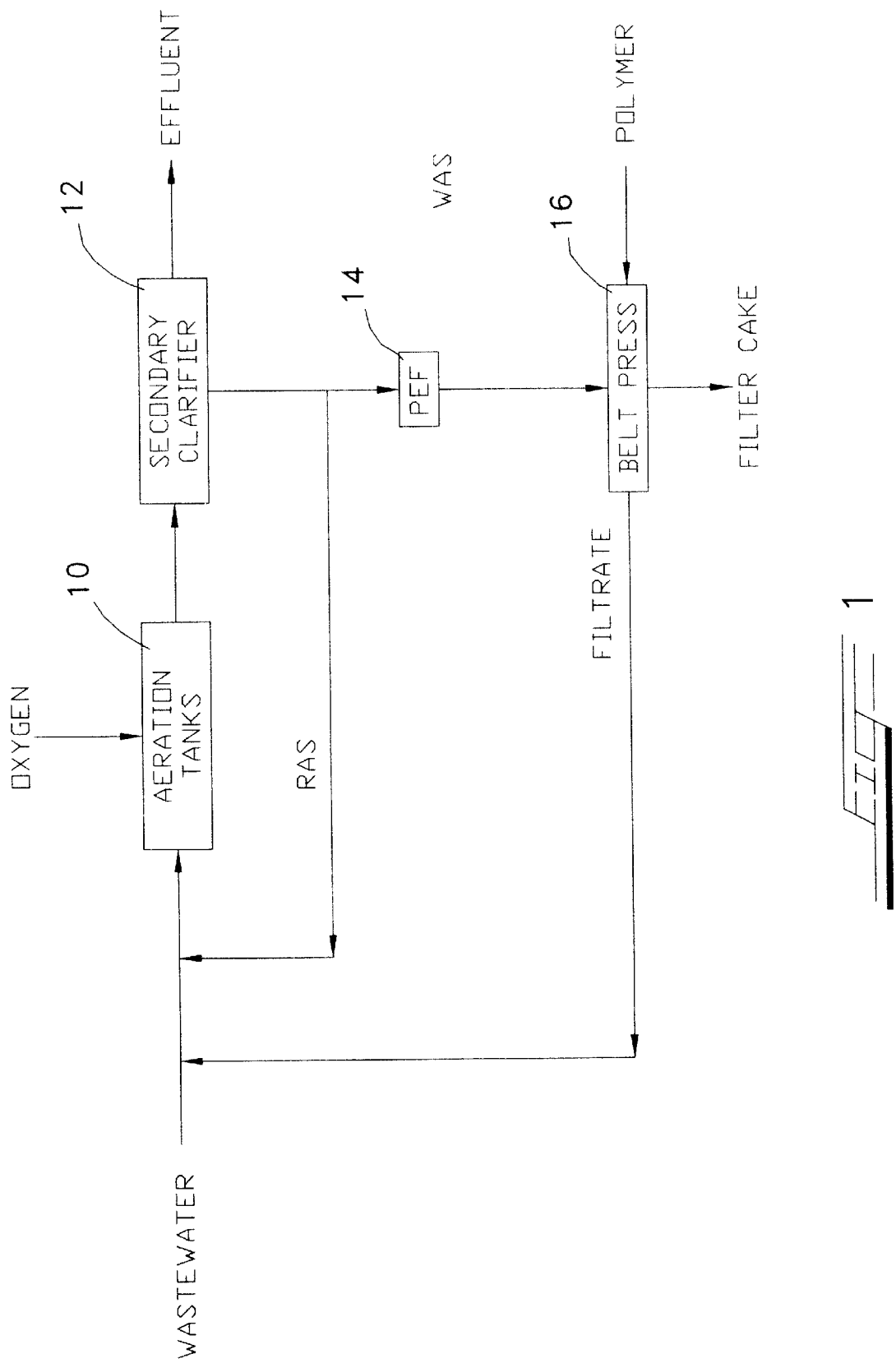
FIG. 1 is a schematic showing the electroporation system as used as a secondary dewatering treatment.

Referring to FIG. 1, there is shown the schematic for using the PEF-electroporation system as a secondary treatment for previously-dewatered sludge, as disclosed in Applicant's copending application Ser. No. 09/468,427. In FIG. 1, the wastewater is delivered to the primary treatment, aerobic-reactor tanks 10, and from to a secondary clarifier 12. From there, the WAS is delivered to the PEF-electroporation system 14 of the invention for deactivating the WAS to make it a Class "B" biomass for easier disposal. The biomass is then sent to a belt press 16 for further processing and disposal.

Referring now to FIG. 2, there is shown the flow chart of the present invention for employing the PEF-electroporation system as part of the primary treatment. In this system, the biosolids exiting from the PEF-electroporation system 14 are returned to the aeration tanks 10, since, as explained above, the PEF process causes the release of intracellular, dissolved organic matter, which is used as "food" for the bacteria of the aeration tanks. This "food" not only is further treated in the aeration tanks via aerobic digestion, but actually causes the aerobic digestion process in the aerobic tank itself to be accelerated for the same amount of oxygen supplied.

A practical problem with the system of FIG. 2 is that the PEF throughput needs to be of the same order of magnitude as the WAS disposal rate in order to see a noticeable effect of PEF on WAS reduction. For this reason a 1.8 ton (DS)/day PEF system has been chosen as a pilot plant. With such a system, a WAS reduction of 0.9 ton/day on a dry basis or 7.5 tons/day on a filter press cake (at 12 percent solids) basis may be achieved. In terms of thickened sludge (at 2 percent solids) basis, this translate to elimination of 45 tons/day needing to be flocculated and dewatered. This will require PEF treatment of 15 gpm WAS at 2 percent solids.

One way to reduce the cost of the pilot plant, which is driven by the PEF power supply and pulser cost, is to pre-thicken the WAS. Therefore, a 15 gpm rental centrifuge 18 is used for pilot testing. It is estimated that this will produce a 5 gpm feed for the PEF reactor at a solids content of 6 percent. Such a feed can be handled by a Moyno pump. The feed streams to the centrifuge and the PEF units are represented as Stream Nos. 10 and 11, respectively in FIG. 2. However, in practical application such as centrifuge may not be necessary.

PEF POWER SUPPLY AND PULSER DESIGN

Figure 3:
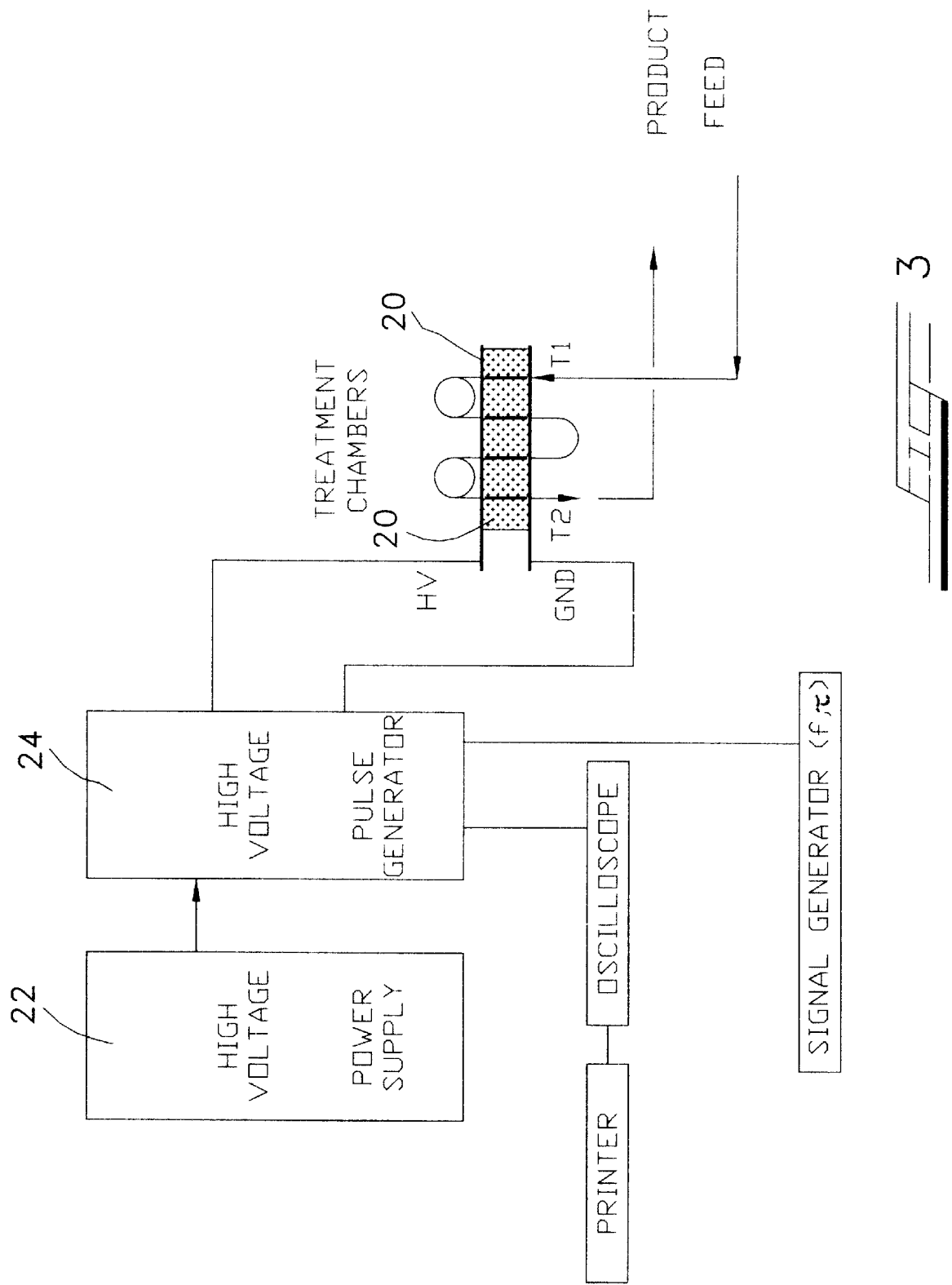
FIG. 3 is a schematic showing the electroporation sub-system for use in dewatering municipal, paper-pulp, animal and plant waste sludges.

The conceptual design of the power supply and the pulse generator (pulser) for the system of FIG. 2 is shown in FIG. 3. This figure shows four chambers 20 in series, although two chambers also can be used if the pulse rate is increased. The specifications for the two-chamber design are shown in Table 1. The design requires a 35 kW input power supply 22 (32 kW continuous output) delivering 30 kV. The pulse generator 24 is 200 amp maximum current and a pulse rate of 4,000 hz. (maximum).

TABLE 1

Pilot Plant PEF Power Supply, Reactor, and Pulser

| Chambers | |
|---|---|
| Gap Distance D (cm) | 1.2 |
| Chamber | 1 |
| Number of chambers in use | 2 |
| Flow Conditions | |
| Flow rate (ml/s) | 315 |
| PEF Parameters | |
| Voltage to apply (kV) | 30 |
| Rep-rate (pps) | 3342.254 |
| Pulse duration (ps) | 4 |
| Physical Properties | |
| Conductivity (S/m) | 0.2 |
| Density (g/cm$^3$) | 1 |
| Specific Heat ([J/(g · ° C.)] | 4.18 |
| Viscosity (Pa · s) | 0.0100 |
| Dosage Level | |
| Electric Field Strength (kV/cm) | 25 |
| Total Treatment Time ($\mu$s) | 80 |
| Number of pulses per chamber | 10 |
| Temperature Change | |
| Temperature increase per pair of chamber (° C.) | 11.962 |

TABLE 1-continued

Pilot Plant PEF Power Supply, Reactor, and Pulser

| Related Information | |
|---|---|
| Residence Time (s) | 0.00299 |
| Flow Speed (cm/s) | 401.070 |
| Energy Consumption (J/ml) | 100 |
| Estimated Power requirement (W) | 31500 |
| Reynolds Number | 4010.705 |
| Pulse Generator Current | 78.5 |

Figure 4:
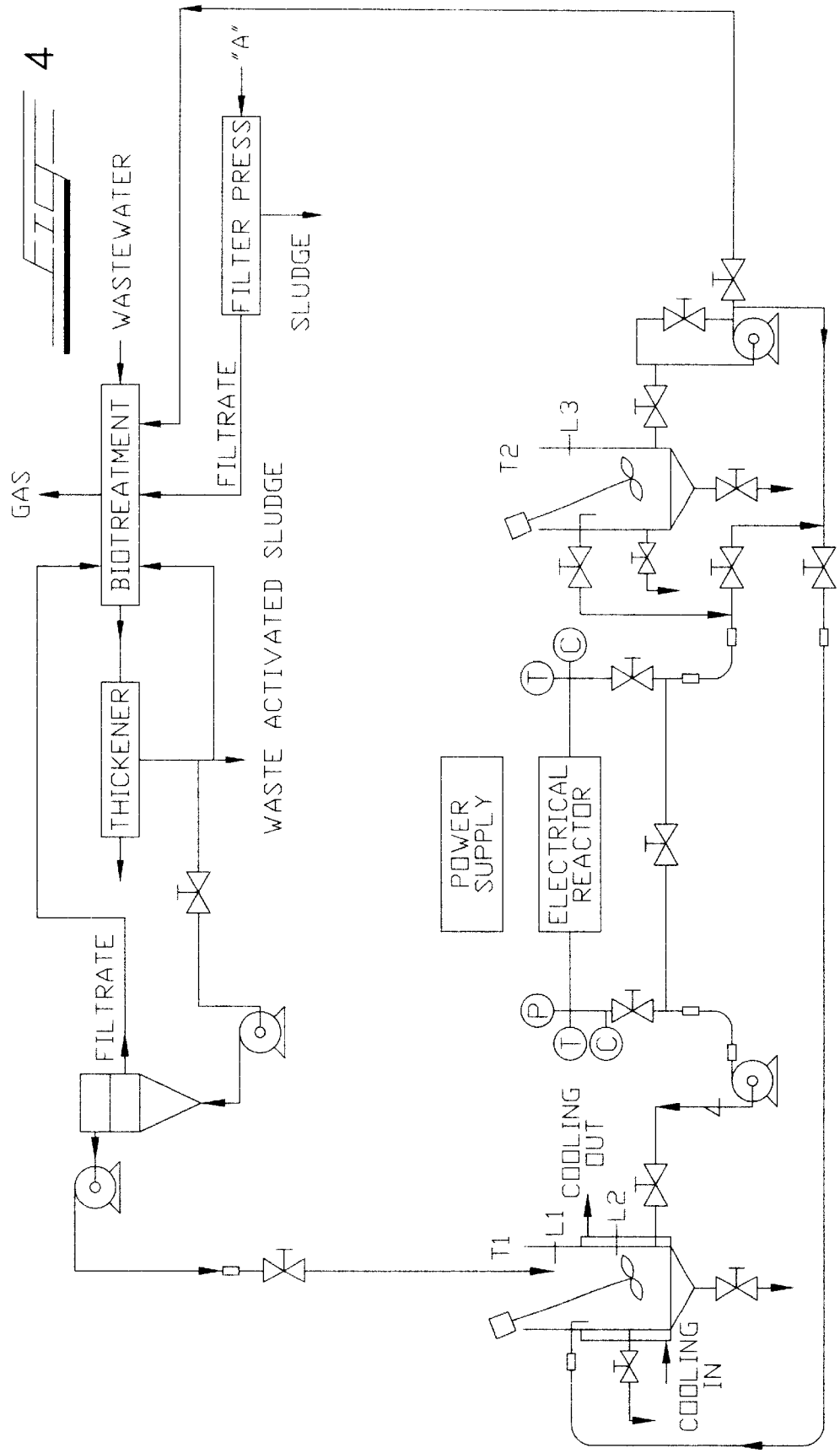
FIG. 4 is a schematic diagram showing the overall apparatus of the present invention incorporating the electroporation sub-system for use as a primary or secondary dewatering treatment.

The actual sludge handling system and the associated instrumentation is shown in FIG. 4. A detailed list of specifications is provided in Table 2. Tank T1 holds up to 100 gallons of untreated feed material, delivered through valve V1 from the centrifuge. A mixer is provided for blending infeed material. A bottom drain allows disposal to sewer at the end of a test run. Valve V4 is provided for withdrawing a sample for analysis. Material leaves T1 through V2 and a strainer to a variable-speed progressing cavity pump, which can flow from 0.5 to 5.0 gallons per minute. The tank, pump mixer and associated valves are mounted to one 42-inch square skid for transport purposes. The feed leaving P1 passes through quick-connect fittings to a reinforced hose to the reactor.

The PEF-electroporation reactor subsystem includes a power supply, pulse generator and pairs of treatment chambers as described above with reference to FIG. 3. These would be mounted to a skid, along with associated valves V5, 6 and 7. Quick-connect fittings and hose convey the treated material to valves on the outlet tank skid. Valves V12 and 13 permit the treated material to be recycled back to T1. Valve V8 permits the treated material to enter tank T2, of 100-gallon capacity. As with T1, a mixer, a sample port and a bottom drain are provided. Tank Tank T2, pump P2, mixer M2 and associated valves are mounted to another skid. Treated material leaving through V10 leads to transfer pump P2. Valve V15 is a globe style for adjusting the flow rate through V14 to tank T1. Valve V13 allows treated material from T2 to return to T1, assisted by P2, to increase treatment time.

The P2 pump is used to return the treated sludge to the biotreatment plant, aerobic tanks, when the PEF-electroporation system is used as a primary system, or optionally to filter press, if desired, when the PEF-electroporation system is used as a secondary treatment.

Safety logic has been incorporated as follows. Level control L1 will close V1 to prevent overfilling T1, with subsequent spillage. Level control L2 will shut down P1 and the power supply when the liquid level becomes too low. Level control L3 will shut down P1 and the power supply when tank T2 becomes full, to prevent spillage.

TABLE 2

Sludge Handling System Specifications

| Description | Qty |
|---|---|
| Supplier | |
| Inlet Tank | |
| T1 100-Gal carbon steel jacketed mixing tank<br>Buckeye Fab. | 1 |
| 2-inch PVC, Schedule 80 90-Deg. elbow, | 1 |

TABLE 2-continued

Sludge Handling System Specifications

| Description | Qty |
|---|---|
| 806-020 (bypass in) | |
| Harrington Mixer, | |
| C-Clamp mount direct drive, 1/4 HP, 400-250-DD-ED | 1 |
| Harrington | 2 |
| Union ball valve, 2-inch socket, 1001020 | |
| Harrington | 1 |
| Strainer, 2-inch clear PVC, RVAT108 | |
| Harrington | 1 |
| Replacement screen, PVC | |
| Harrington | 1 |
| 2-inch PVC, Schedule 80 pipe, 800-020, 20 feet length | |
| Harrington | 2 |
| 2-inch PVC, Schedule 80 90-Deg elbow, 806-020 | |
| Harrington | 2 |
| Quick disconnect, Part F, 2-inch, polypro., FPP-020 | |
| Harrington | 2 |
| Quick disconnect, Part C, 2-inch, polypro., CPP-020 | |
| Harrington | 100 ft |
| Hose, PVC standard duty, 2-inch, 110P-020 | |
| Harrington | 10/pack |
| Hose clamps, 3-inch, H-44SS | |
| Harrington | 1 |
| Bulkhead fitting, ½-inch PVC BF10050SXT | |
| Harrington | 1 |
| Ball valve, ½-inch socket, 107005 | |
| Harrington | 1 |
| Elbow, 90-degree, ½-inch Sch 80 PVC, 806-005 | |
| Harrington | 1 |
| Level control, high to shut feed valve, LV751 | |
| Omega | 1 |
| Level control, low to shut off pump P1 and | |
| Powr supply, LV751 | |
| Omega | 1 |
| Solid state relay for feed valve, SSR240AC10 | |
| Omega | 1 |
| Solid state relay for pump and power supply, SSR240AC25 | |
| Omega | 1 |
| Feed Valve V1 | |
| Quick disconnect, Part F, 2-inch, polypro., FPP-020 | |
| Harrington | 1 |
| Quick disconnect, Part C, 2-inch, polypro., CPP-020 | |
| Harrington | 1 |
| Union ball valve, 2-inch, 1001020 | |
| Harrington | 1 |
| Electric actuator, 2085020 | |
| Harrington | 1 |
| Process Pump P1 | |
| Pump, 5.0 down to 0.5 GPM, 35 psi, Moyno | |
| Buckeye Pump | 1 |
| Direct Current control for pump, NEMA 4 enclosure | |
| Buckeye Pump | 2 |
| Hose nipples, polypro., 2-inch, HNPP-020 | |
| Harrington | 2 |
| 2-inch PVC, Schedule 80 tee, 801-020 | |
| Harrington | 1 |
| 2-inch PVC, Schedule 80 pipe, 800-020, 20 feet length | |
| Harrington | 2 |
| 2-inch PVC, Schedule 80 90-Deg elbow, 806-020 | |
| Harrington | 2 |
| Reactor Connections | |
| Quick disconnect, Part F, 2-inch, polypro., FPP-020 | |
| Harrington | 2 |
| Quick disconnect, Part C, 2-inch, polypro., CPP-020 | |
| Harrington | 1 |
| Union ball valve, 2-inch socket, 1001020 | |
| Harrington | 2 |
| 2-inch PVC, Schedule 80 socket tee, 801-020 | |
| Harrington | |
| Supplier | |
| Reducing bushing, 2-inch by ½-inch thread, 838-247 | 2 |
| Harrington | 2 |
| ½-inch by 1-½-inch long PVC Schedule 80 nipple, 882-015 | |

TABLE 2-continued

Sludge Handling System Specifications

| Description | Qty |
|---|---|
| Harrington | 2 |
| Union ball valve, ½-inch threaded, 1001005 | |
| Harrington | 1 |
| ½-inch PVC Schedule 80 threaded tee, 805-005 | |
| Harrington | 2 |
| Reducing bushing ½-inch to ¼-inch threaded, 839-072 | |
| Harrington | 1 |
| Pressure gauge with guard, 0–60 psig, GGME060-PP | |
| Harrington | 2 |
| Tube adapter, ¼-inch MPT to ¼-inch tube, 4MSC4N-B | |
| Parker | |
| Outlet Tank | |
| T2 | 1 |
| 100-Gal jacketed carbon steel tank with legs, 2-in outlet | |
| Buckeye Fab. | 1 |
| 2-inch PVC, Schedule 80 90-Deg elbow, 806-020 (inlet) | |
| Harrington | |
| Union ball valve, 2-inch socket 1001020 | |
| Harrington | 3 |
| Quick disconnect, Part F, 2-inch, polypro., FPP-020 | |
| Harrington | 3 |
| Quick disconnect, Part C, 2-inch, polypro., CPP-020 | |
| Harrington | 4 |
| 2-inch PVC, Schedule 80 90-Deg elbow, 806-020 | |
| Harrington | 2 |
| 2-inch PVC, Schedule 80 socket tee, 801-020 | |
| Harrington | 3 |
| 2-inch PVC, Schedule 80 threaded tee, 805-020 | |
| Harrington | 2 |
| 2-inch by 6-inch PVC, Schedule 80 nipple | |
| Harrington | 1 |
| Mixer, C-Clamp mount direct drive, 1/4 HP, 400-250-DD-ED | |
| Harrington | 1 |
| ½-inch by 2-inch PVC, Schedule 80 | |
| Harrington | 1 |
| Ball valve, ½ inch socket, 107005 | |
| Harrington | 1 |
| Elbow 90-degree, ½-inch Sch 80 PVC, 806-005 | |
| Harrington | 1 |
| Level control, low to shut off pump P1 and Powr supply, LV751 | |
| Omega | 1 |
| Solid state relay for pump and power supply, 55R240AC25 | |
| Omega | |
| Outlet Tank Pump | |
| Pump, 5 GPM 20 feet of head, centrifugal | |
| 1 Buckeye Pump | |
| Motor starter, NEMA 4 with thermal unit | 1 |
| C.E.D. | |
| Hose nipples, polypro., 2-inch, HNPP-020 | 4 |
| Harrington | 1 |
| Glove valve, threaded, PVC, 2-inch, 1261020 | |
| Harrington | |
| Product Pump P2 | |
| Pump, 5 GPM 20 feet of head, centrifugal | 1 |
| Buckeye Pump | |
| Motor starter, NEMA 4 with thermal unit | 1 |
| C.E.D. Sealtite, ½-inch | lot |
| C.E.D. Wires, cords | lot |
| C.E.D. | |
| Skids | |
| 42-inch square, metal, fork lift entry four sides | |
| Supplier | |
| Instrumentation | |
| Oscilloscope, storage, two inputs, 100 MHz, printer interface | 1 |
| Tektronix | 1 |
| Current sensor, 0.01 Volt/Ampere, 100 Amp.max. | |

TABLE 2-continued

Sludge Handling System Specifications

| Description | Qty |
|---|---|
| Pearson Electr. Clamp-on flowmeter, 2 to 12-inch pipe, 4–20 ma output Controlotron | 1 |
| Voltage sensor, 60 Kilovolt, 1000v/1V, Type PVM-1 North Star Resch | 1 |
| Printer, Epsom jet Model 740, Part No. C257001 parallel port ADS Systems | 1 |
| Centronics-type paraller printer port cost, Epsom F2E020-06 ADS Systems | 1 ea. |
| Type K thermocouple readout, omega DP45KF + SB45 Omega | 2 |
| Type K thermocouple, 304SS sheath, 1/8-in. dia., KQSS-18G-12 Omega | 1 |
| Conductivity and pH meter, 0–200 $\mu$S, 0–14 pH, P-19651-20 Cole-Parmer | 2 |
| Conductivity and pH flow-through cell, P-19502-42 Cole-Parmer Alternative clamp-on flow meter, Omron FD-303 + FD-5 sensor for 1/4-in. to 3/4-in. pipe + FD-5000 sensor for 3/4-in. to 12-in. pipes. | |

While a specific embodiment of the invention has been shown and described, it is to be understood that numerous changes and modifications may be made therein without departing from the scope and spirit of the invention as set forth in the appended claims.

What is claimed is:

1. A method of treating paper-pulp waste activated sludge, municipal waste activated sludge, plant and animal waste activated sludge containing intra-cellular water molecules contained in molecular cellular units of the waste activated sludge, the waste activated sludge being formed by aerobically digesting waste water in an aeration tank supplied with oxygen, and clarifying the aerobically digested waste water in a clarifier to form effluent and said waste activated sludge, comprising:

(a) pumping the waste activated sludge into an apparatus for destroying at least most of the individual cellular units of the waste activated sludge in order to release the intracellular water molecules contained therein; and (b) destroying in the apparatus at least most of the individual cellular units of the waste activated sludge in order to release the intra-cellular water molecules contained therein; and said step (b) causing massive disruption of the cellular matter, allowing for the release of bound as well as intra-cellular liquids and intracellular dissolved/organic matter, which may be used as food for bacteria in said aeration tank;

(c) directing the released intracellular dissolved/organic matter to said aeration tank for supplying food to bacteria of said aeration tank; said step (b) comprising electroporating said waste activated sludge by means of a nonarcing pulsed electric field having a voltage between 15 kV/cm and 100 kV/cm.

* * * * *

UNITED STATES PATENT AND TRADEMARK OFFICE
CERTIFICATE OF CORRECTION

PATENT NO.     : 6,395,176 B1
DATED          : March 28, 2002
INVENTOR(S)    : Held et al.

It is certified that error appears in the above-identified patent and that said Letters Patent is hereby corrected as shown below:

<u>Title page,</u>
Item [75], Inventors, please add -- Anthony J. Tomasello, Libertyville, IL --

Signed and Sealed this

Twenty-sixth Day of October, 2004

JON W. DUDAS
*Director of the United States Patent and Trademark Office*

UNITED STATES PATENT AND TRADEMARK OFFICE
CERTIFICATE OF CORRECTION

PATENT NO. : 6,395,176 B1
DATED : March 28, 2002
INVENTOR(S) : Jeffery S. Held et al.

It is certified that error appears in the above-identified patent and that said Letters Patent is hereby corrected as shown below:

Column 3,
Line 55, cancel "ps" and insert -- $\mu$s --.

Signed and Sealed this

Eleventh Day of January, 2005

JON W. DUDAS
*Director of the United States Patent and Trademark Office*